United States Patent
Nakagawa et al.

(10) Patent No.: US 12,203,852 B2
(45) Date of Patent: Jan. 21, 2025

(54) DIGITAL PCR MEASURING DEVICE

(71) Applicant: HITACHI, LTD., Tokyo (JP)

(72) Inventors: Tatsuo Nakagawa, Tokyo (JP); Junko Tanaka, Tokyo (JP); Yuzuru Shimazaki, Tokyo (JP); Kunio Harada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 754 days.

(21) Appl. No.: 17/435,310

(22) PCT Filed: Feb. 26, 2020

(86) PCT No.: PCT/JP2020/007644
§ 371 (c)(1),
(2) Date: Aug. 31, 2021

(87) PCT Pub. No.: WO2020/189197
PCT Pub. Date: Sep. 24, 2020

(65) Prior Publication Data
US 2022/0155227 A1   May 19, 2022

(30) Foreign Application Priority Data
Mar. 19, 2019 (JP) .................... 2019-051573

(51) Int. Cl.
G01N 21/64   (2006.01)
G01N 21/03   (2006.01)
G01N 21/15   (2006.01)

(52) U.S. Cl.
CPC ......... *G01N 21/6428* (2013.01); *G01N 21/03* (2013.01); *G01N 21/15* (2013.01); *G01N 21/6456* (2013.01); *G01N 2021/6439* (2013.01)

(58) Field of Classification Search
CPC .... G01N 21/6428; G01N 21/03; G01N 21/15; G01N 21/6456; G01N 2021/6439
See application file for complete search history.

(56) References Cited

U.S. PATENT DOCUMENTS

| | | |
|---|---|---|
| 2003/0180191 A1 | 9/2003 | Suzuki et al. |
| 2005/0123924 A1 | 6/2005 | Rashtchian et al. |
| 2008/0038737 A1 | 2/2008 | Smith et al. |
| 2010/0112567 A1 | 5/2010 | Adolfsen |
| 2012/0115214 A1 | 5/2012 | Battrell et al. |
| 2012/0126142 A1 | 5/2012 | Matsui et al. |
| 2015/0354013 A1 | 12/2015 | Taylor et al. |
| 2019/0055600 A1 | 2/2019 | Saeki |
| 2019/0352699 A1 | 11/2019 | Tanaka et al. |
| 2021/0130877 A1 | 5/2021 | Tanaka et al. |
| 2022/0155227 A1 | 5/2022 | Nakagawa et al. |

FOREIGN PATENT DOCUMENTS

| | | | |
|---|---|---|---|
| JP | 2009-535066 A | 10/2009 | |
| JP | 2010-508813 A | 3/2010 | |
| JP | 2010-286421 A | 12/2010 | |
| JP | 2011-083286 A | 4/2011 | |
| JP | 2012-516455 A | 7/2012 | |
| JP | 2016-024137 A | 2/2016 | |
| JP | 2017-123813 A | 7/2017 | |
| JP | 2018-108063 A | 7/2018 | |
| JP | 2020-150824 A | 9/2020 | |
| WO | 2002/025289 A1 | 3/2002 | |
| WO | 2008/096563 A1 | 8/2008 | |
| WO | 2017/138484 A1 | 8/2017 | |
| WO | WO-2018128013 A1 * | 7/2018 | .............. C12M 1/00 |
| WO | 2019/239805 A1 | 12/2019 | |

OTHER PUBLICATIONS

Tanaka WO 2018/128013 (English translated version attached).*
Japanese Office Action issued on Jul. 26, 2022 for Japanese Patent Application No. 2019-051573.
Tanaka, J., "KRAS genotyping by digital PCR combined with melting curve analysis", Paper, Center for Technology Innovation, Tokyo, Japan (2019).
Japanese Office Action issued on Oct. 31, 2023 for Japanese Patent Application No. 2022-190020.

* cited by examiner

*Primary Examiner* — Jezia Riley
(74) *Attorney, Agent, or Firm* — Volpe Koenig

(57) ABSTRACT

A digital PCR measuring apparatus capable of measuring a melting curve with high accuracy is provided. The digital PCR measuring apparatus includes a temperature adjuster that controls a temperature of a sample container including a plurality of minute regions, a fluorescence measurement part that measures fluorescence intensity of a plurality of minute regions, and a controller that controls the temperature adjuster and the fluorescence measurement part. The controller controls the temperature adjuster to raise a temperature of the sample container, and, after removing air bubbles generated in the sample container, measures fluorescence intensity of a plurality of minute regions while controlling the temperature adjuster to lower the temperature of the sample container, and measures a melting curve of a plurality of the minute regions.

12 Claims, 18 Drawing Sheets

DIGITAL PCR MEASURING DEVICE

TECHNICAL FIELD

The present invention relates to a digital PCR measuring apparatus.

BACKGROUND ART

Digital polymerase chain reaction (PCR) is a technique for detecting a nucleic acid with high sensitivity, and can detect a gene mutation at a lower frequently than that detected in conventional real-time quantitative PCR. PTL 1 discloses, as a DNA detection method using digital PCR, a DNA detection method of measuring a melting temperature of DNA and a fluorescently labeled probe hybridized to the DNA in a droplet containing the DNA and the fluorescently labeled probe.

Further, PTL 2 discloses a configuration in which a multi-vessel thermal cycler array having a plurality of single-vessel thermal cyclers each of which is individually temperature-controllable can vibrate reaction liquid in order to reduce a temperature gradient of the reaction liquid or to vent bubbles that may interfere with an optical inspection.

CITATION LIST

Patent Literature

PTL 1: JP 2018-108063 A
PTL 2: JP 2010-508813 A

SUMMARY OF INVENTION

Technical Problem

In digital PCR, a sample containing DNA to be detected is divided into a large number of minute regions, PCR is performed on each minute region, and a type of DNA present in each minute region is determined. In the digital PCR disclosed in PTL 1, a target gene in a sample and a fluorescently labeled probe that is hybridized to the target gene are used, and a melting curve of these is measured and analyzed to determine a type of the target gene. In order to measure the melting curve, the temperature dependency of the fluorescence intensity of the fluorescently labeled probe is measured.

There are a plurality of types of genes to be measured, and examples of these include a wild-type gene and its mutant-type gene. Since the melting curve varies depending on a type of the target gene and the fluorescently labeled probe, the type of the target gene can be determined by measuring the melting curve. However, in a case where a mutant-type gene is measured, a base sequence of the mutant-type gene may be different from a base sequence of a wild-type gene by only one base. For this reason, the difference between the melting curves is small, and it is necessary to measure the fluorescence intensity and the melting curve with high accuracy in order to determine a gene type with high accuracy. Further, in the case of simultaneously measuring a large number of genes, it is important to perform measurement with less variation.

One of factors that lower the measurement accuracy of the fluorescence intensity and the melting curve is the presence of air bubbles. When air bubbles are generated in the vicinity of a sample as the temperature rises, this affects fluorescence measurement, and the measurement accuracy of a melting curve and the determination accuracy of a gene type are deteriorated. In order to determine a plurality of gene types, fluorescence measurement at a plurality of wavelengths is performed. However, due to the spread of the spectrum of a fluorescently labeled probe, light of a fluorescence measurement at a certain wavelength leaks into another fluorescence measurement. Even in these situations, it is important to measure the fluorescence intensity and the melting curve with high accuracy.

The present invention has been made in view of such circumstances, and an object of the present invention is to provide a digital PCR apparatus capable of removing the influence of air bubbles and measuring a melting curve with high accuracy. The foregoing and other objects and novel features of the present invention will be clarified from the description of the present description and the accompanying drawings.

Solution to Problem

A digital PCR measuring apparatus according to an aspect of the present invention is a digital PCR measuring apparatus that detects DNA contained in a sample. The digital PCR measuring apparatus includes a temperature adjuster that controls a temperature of a sample container including a plurality of minute regions to which a fluorescently labeled probe and a sample containing DNA to be detected are supplied, a fluorescence measurement part that measures fluorescence intensity of the plurality of the minute regions, and a controller that controls the temperature adjuster and the fluorescence measurement part. The controller controls the temperature adjuster to increase a temperature of the sample container, and, after removing an air bubble generated in the sample container, measures fluorescence intensity of the plurality of the minute regions while controlling the temperature adjuster to lower a temperature of the sample container, and measures a melting curve of a plurality of the minute regions.

Advantageous Effects of Invention

According to the present invention, it is possible to provide a digital PCR measuring apparatus capable of highly accurately measuring fluorescence intensity and a melting curve by removing the influence of air bubbles, and capable of determining a type of a gene with high accuracy.

DESCRIPTION OF EMBODIMENTS

Figure 1:
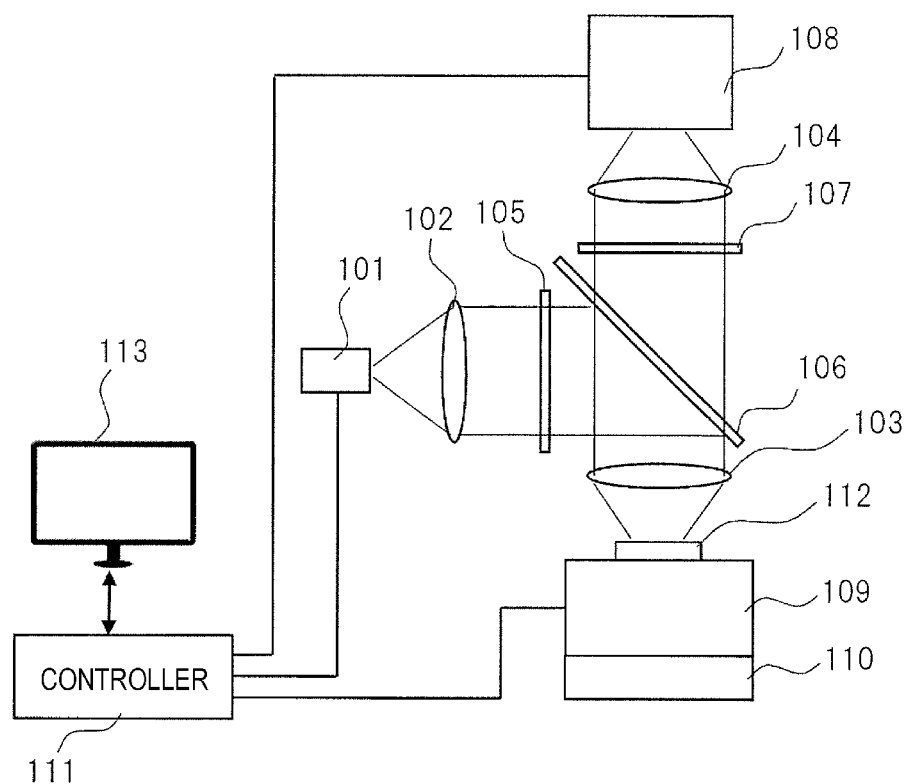
FIG. 1 is a configuration diagram of a digital PCR measuring apparatus according to a first embodiment.

Hereinafter, the present embodiment will be described with reference to the accompanying drawings. In the accompanying drawings, elements that are functionally the same may be represented by the same or corresponding numbers. Note that, although the accompanying drawings illustrate embodiments and implementation examples conforming to the principle of the present disclosure, these are for understanding the present disclosure and are not used to interpret the present disclosure in a limited manner. Description herein is merely a typical exemplification and is not intended to limit the claims or applications of the present disclosure in any way.

In the present embodiment, description is made sufficiently in detail for those skilled in the art to implement the present disclosure. However, it is necessary to understand that other implementations and embodiments are possible, and changes in configurations and structures and replacement of various elements are possible without departing from the scope and spirit of the technical idea of the present disclosure. Therefore, description below should not be interpreted as being limited to the description.

In embodiments below, when necessary for the sake of convenience, description will be divided into a plurality of sections or embodiments. However, unless otherwise specified, they are not unrelated to each other, and one is in a relationship of some or all modifications, details, supplementary explanation, and the like of the other. Further, in embodiments below, when referring to the number of elements or the like (including number, numerical value, amount, range, and the like), the number is not limited to a specific number, and may be a specific number or more or a specific number or less, unless otherwise stated or unless clearly limited to the specific number in principle.

Further, in embodiments below, it goes without saying that the components (including element steps and the like) are not necessarily essential unless otherwise specified or considered to be clearly essential in principle. Similarly, in description of embodiments below, when referring to a shape, a positional relationship, and the like of a component and the like, it is assumed that a shape and the like substantially approximate or similar to a shape and the like of the component are included unless otherwise specified or clearly considered not as such in principle. The same applies to the above numerical value and range. Note that, in all the drawings for describing embodiments, the same members are denoted by the same reference numerals in principle, and repeated description of such members will be omitted.

First Embodiment

FIG. 1 is a schematic diagram illustrating a configuration example of a digital PCR measuring apparatus according to a first embodiment of the present invention. The digital PCR measuring apparatus of the first embodiment includes, as an example, a light source 101, lenses 102, 103 and 104, a short-pass filter 105, a dichroic mirror 106, a long-pass filter 107, a CMOS sensor 108, a temperature adjuster 109, an inclination adjuster 110 (air bubble removing part), a controller 111 (control part), a sample container 112 to which a sample to be measured is supplied, and a display 113 as a display part.

Light emitted from the light source 101 is converted into parallel light by the lens 102. The short-pass filter 105 selectively transmits only light having a certain wavelength in the light converted into parallel light. Light having passed through the short-pass filter 105 is reflected by the dichroic mirror 106, passes through the lens 103, and is emitted to the sample container 112. Fluorescence from a sample is guided by a fluorescence imaging system including the lens 103, the dichroic mirror 106, the long-pass filter 107, and the lens 104, and is incident on an imaging surface of the CMOS sensor 108. In this manner, an image of the sample is captured by the CMOS sensor 108. An image signal acquired by the CMOS sensor 108 is output to the controller 111.

The controller 111 analyzes an image according to a built-in image analysis program and outputs a result to the display 113. The fluorescence imaging system and the CMOS sensor configure a fluorescence measurement part that measures fluorescence intensity of a plurality of minute regions in the sample container 112. The controller 111 has a function of outputting a control signal necessary for measurement operation of the present embodiment to the temperature adjuster 109 and the CMOS sensor 108, and executing certain signal processing on an imaging signal from CMOS sensor 108 to analyze a captured image. As described in detail below, the controller 111 controls the temperature adjuster 109 to raise the temperature of the sample container 112, and, after removing air bubbles generated in the sample container 112, measures fluorescence intensity of a plurality of minute regions while controlling the temperature adjuster 109 to lower the temperature of the sample container 112, and measures a melting curve of a plurality of the minute regions. The display 113 displays a result of measurement executed by the controller 111 as a numerical value, a graph, or the like.

The sample container 112 is installed on the temperature adjuster 109. The temperature adjuster 109 controls the temperature of the sample container 112 in accordance with a command from the controller 111. The temperature adjuster 109 includes, without limitation to, a heater and a Peltier element. The inclination adjuster 110 is installed in the temperature adjuster 109. The inclination adjuster 110 is configured to be able to adjust an inclination angle of the temperature adjuster 109 and the sample container 112 with respect to a horizontal plane. As the inclination angle is adjusted, air bubbles generated in the sample container 112 are removed from the sample container 112. Note that the inclination adjuster 110 is an example of a configuration for removing air bubbles, and the configuration is not limited to the inclination adjuster 110. For example, a vibrator that applies vibration to the sample container 112 may be provided as an air bubble removing part. When vibration is applied to the sample container 112, air bubbles are removed to the outside of the sample container 112. Alternatively, the air bubble removing part may be a flow generating means that applies flow to liquid in the sample container 112 to move air bubbles out of an imaging range.

Figure 2A:
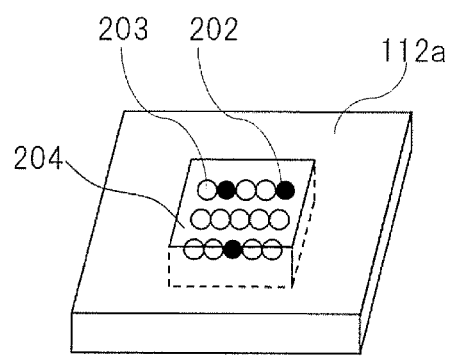
FIG. 2A is an example of a configuration diagram of a sample container according to the first embodiment.

A configuration example of the sample container 112 (112a and 112b) of the first embodiment will be described with reference to FIGS. 2A and 2B. The sample container 112a illustrated in FIG. 2A is a sample container having a configuration in which droplets 202, 203, . . . are arranged on a plane. The sample container 112a has a structure for trapping the droplets. Alternatively, the configuration may be such that the droplets are densely arranged in a space having the same height as the diameter of the droplets. In any configuration, the droplets are arranged by a material that allows fluorescence measurement from any direction of the sample container. Further, the periphery of the droplet in the container is filled with oil 204. The oil contains, without limitation to, fluorine-based oil, mineral oil, and the like. In the sample container 112a, a sample is divided into a plurality of minute regions by droplets and arranged.

Figure 2B:
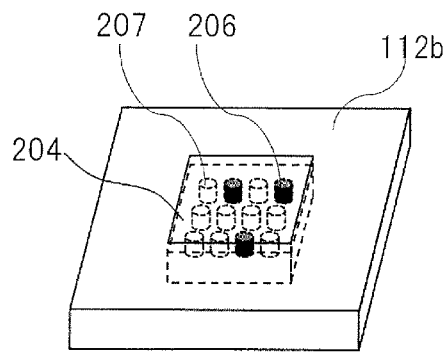
FIG. 2B is an example of a configuration diagram of the sample container according to the first embodiment.

The sample container 112b illustrated in FIG. 2B is a sample container having a configuration in which a sample is divided using wells arranged in an array, instead of droplets. A large number of wells 206, 207, . . . having a size of about 10 to 100 μm are arranged in a matrix, and a sample containing a gene to be measured is put into each well. The well into which the sample is put is filled with the oil 204 similarly to the sample container 112a in FIG. 2A. The number of the wells is several tens of thousands to several millions, and is desirably sufficiently larger than the number of pieces of DNA to be detected that are put into the wells. When a sample is put, there are the well (206) containing DNA and the well (207) not containing DNA. In the sample container 112, a sample is divided into a plurality of minute regions by a plurality of wells and arranged.

Figure 3:
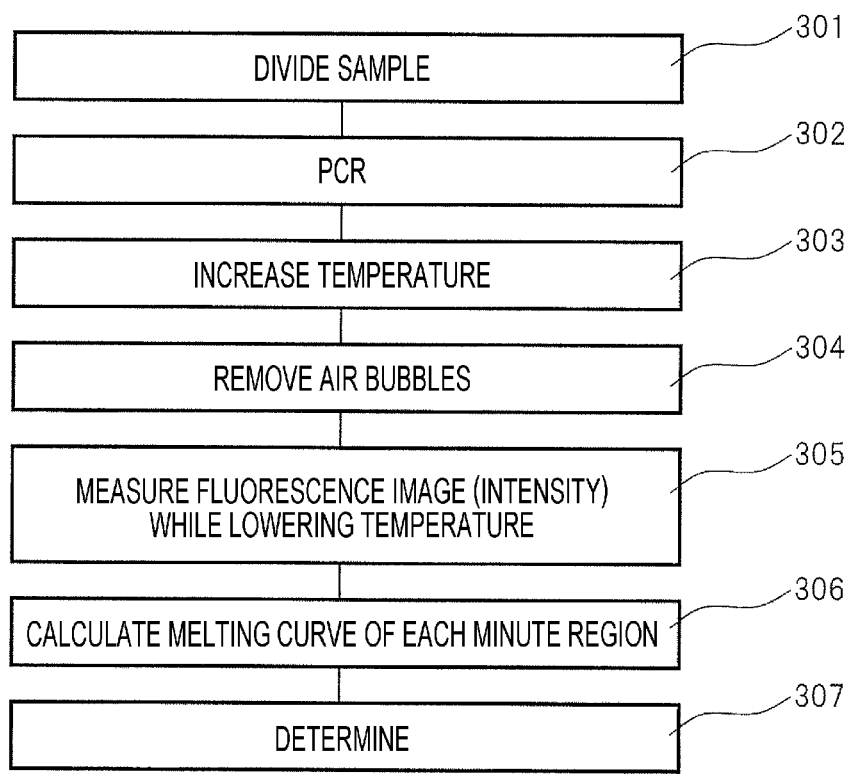
FIG. 3 is a flowchart illustrating a measurement procedure when a type of DNA is determined using the digital PCR measuring apparatus according to the first embodiment.

With reference to the flowchart of FIG. 3, a measurement procedure when a type of DNA is determined using the digital PCR measuring apparatus according to the first embodiment will be described.

First, a sample containing a gene to be detected is put by being divided into a plurality of minute regions in the sample container 112 (Step 301). After that, DNA is amplified by PCR in each of a plurality of the minute regions (Step 302). After the DNA is amplified, the temperature adjuster 109 on which the sample container 112 is mounted is controlled to increase the temperature of the sample (Step 303). At this time, air bubbles are generated in the sample container 112 as the temperature of the sample and the sample container 112 rises. As to the air bubbles, there are, without limitation to, a case where gas dissolved in oil is generated as the temperature rises, a case where a material in the sample container 112 is vaporized, a case where air bubbles originally contained in the oil 204 or the sample expand due to the temperature rise, and the like. From the viewpoint of accurately measuring a melting curve, the temperature rise in Step 303 is preferably set to a temperature higher by 5° C. or more than a melting temperature of the DNA to be detected and a fluorescently labeled probe.

After the temperature is increased in Step 303 or while the temperature is increased in Step 303, air bubbles generated in the sample container 112 are removed (Step 304). As described above, air bubbles are removed by means such as inclining the sample container 112 by the inclination adjuster 110 or vibrating the sample container 112.

After the above, a fluorescence image of the sample is measured while the temperature of the sample is lowered by the temperature adjuster 109 (Step 305). Then, the fluorescence intensity of each minute region and a melting curve that is temperature dependency of the fluorescence intensity are calculated from the fluorescence image (Step 306), and a type of DNA in each minute region is determined (Step 307). Specifically, the CMOS sensor 108 acquires a plurality of fluorescence images at certain time intervals while the temperature of the sample is lowered. Then, a melting curve is calculated by identifying a temporal change in fluorescence intensity for each minute region of a plurality of the images. Note that the rate (inclination) of the temperature decrease in Step 305 is preferably smaller than the rate of the temperature rise in Step 303 (see reference numerals 801 and 803 in FIG. 9A described later).

Figure 4A:
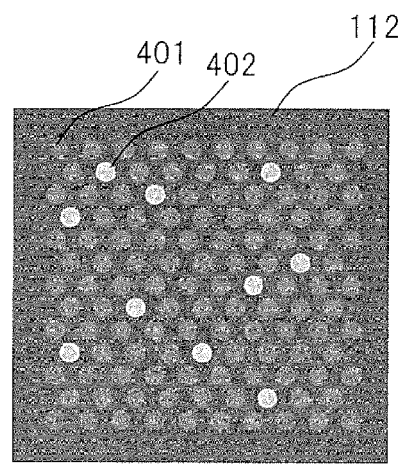
FIG. 4A illustrates an example of a fluorescence measurement image of a sample container obtained by the digital PCR measuring apparatus according to the first embodiment.

FIG. 4A is a schematic view illustrating an example of a fluorescence image of a sample container according to the digital PCR measuring apparatus of the present embodiment. When a fluorescence image is captured in a state where a sample is divided and put into a plurality of minute regions in the sample container 112, fluorescence by the fluorescently labeled probe is captured. A minute region in which DNA to be detected is included has a strong fluorescence intensity at a low temperature and a weak fluorescence intensity at a high temperature. In contrast, a minute region in which DNA to be detected is not included has a relatively low fluorescence intensity.

Figure 4B:
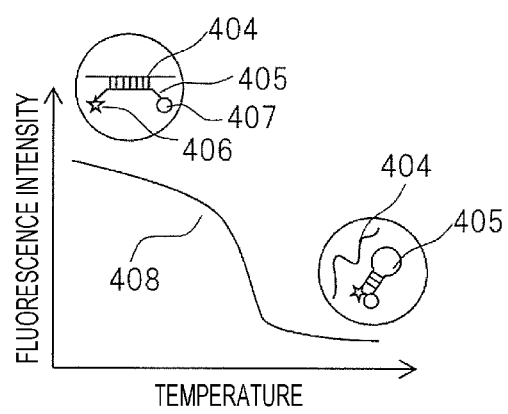
FIG. 4B is an example of a melting curve measured by the digital PCR measuring apparatus according to the first embodiment.

FIG. 4B is a schematic diagram illustrating an example of a melting curve measured using the digital PCR measuring apparatus according to the first embodiment. By performing the fluorescence measurement while lowering the temperature of the sample, a graph illustrating the temperature dependency of the fluorescence intensity can be acquired. A fluorescently labeled probe 405 has a fluorescent dye 406 and a quencher 407 of the fluorescent dye 406 at both ends or in the vicinity of both ends, and sequences around both ends are complementary to each other to form a stem loop structure like a molecular beacon. Further, the fluorescently labeled probe 405 has a sequence of a loop portion complementary to template DNA 404, and is designed to have a structure that allows hybridization to the template DNA 404. When existing alone in a free form, the fluorescently labeled probe 405 forms a stem loop and does not emit fluorescence because the fluorescent dye 406 and the quencher 407 are in close proximity. When the template DNA 404 and the loop portion of the fluorescently labeled probe 405 are hybridized, the fluorescent dye 406 and the quencher 407 are separated, so that the fluorescently labeled probe 405 emits fluorescence. When the temperature of the sample is high and the DNA 404 and the fluorescently labeled probe 405 are dissociated, the stem loop is formed in the fluorescently labeled probe 405, and the fluorescence intensity decreases. For this reason, when the fluorescence intensity is measured while the temperature is lowered, a state in which the fluorescence intensity increases can be acquired.

Figure 4C:
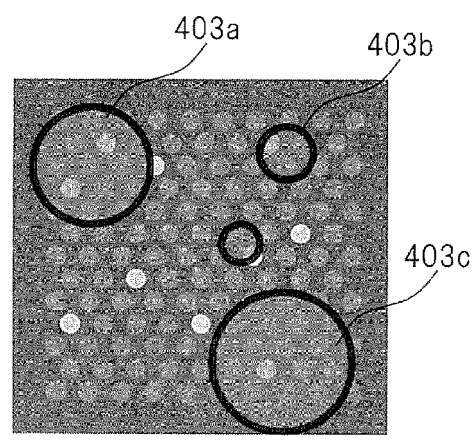
FIG. 4C is a conceptual diagram for explaining a state in which air bubbles are generated in a sample container 112.
Figure 4D:
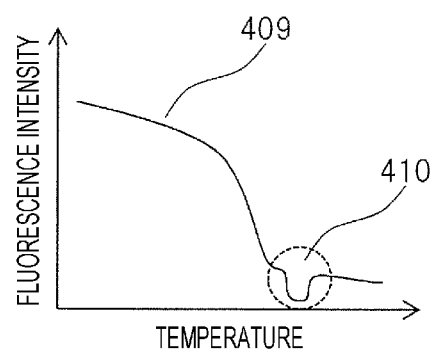
FIG. 4D is an example of a melting curve when air bubbles are generated in the sample container 112.

When a melting curve is measured, since the temperature of the sample is changed by the temperature adjuster 109, air bubbles may be generated in the sample container 112. FIG. 4C illustrates an example of a schematic diagram of a fluorescence image when air bubbles are generated in the sample container 112. In a case where there are air bubbles (403a to 403c), the intensity of irradiation light or the intensity of fluorescence from the fluorescently labeled probe is affected by scattering of light on a surface of the air bubbles or the like, and the fluorescence image is affected. In digital PCR, since a sample is divided into a large number of minute regions (droplets or wells) in a sample container, the size of each minute region is small, and its capacity is in units of picoliters to nanoliters. There is a case where the size of air bubbles is larger than that of each minute region, and in a region covered by air bubbles or a region located at an edge of air bubbles, the fluorescence intensity emitted from the minute region is affected by air bubbles. FIG. 4D is an example of a melting curve 409 in a case where a region is affected by air bubbles. In this curve, the fluorescence intensity decreases near the temperature at which air bubbles are generated (reference numeral 410 in FIG. 4D), and the melting curve 409 is affected by this. For this reason, the fluorescence intensity cannot be accurately measured. Such a case results in an error in melting temperature calculation, which may lead to erroneous determination of a gene type.

For this reason, in the digital PCR measuring apparatus according to the first embodiment, after a sample is put into the sample container 112, the temperature of the sample is once raised using the temperature adjuster 109 or the like to generate air bubbles, the air bubbles are removed, and then the fluorescence image is measured while the temperature is lowered using the temperature adjuster 109 or the like. In this manner, it is possible to suppress the generation of air bubbles in the sample container 112 during the fluorescence image measurement, and it is possible to reduce the influence of air bubbles at the time of calculating a melting curve. For this reason, a melting curve can be calculated with high accuracy. Further, a melting temperature can be obtained with high accuracy, and a type of a target gene can be detected with high accuracy.

Specifically, for example, first, the temperature of a sample in the sample container 112 is raised to, for example, 85° C. to generate air bubbles, and then the air bubbles are removed using the inclination adjuster 110. The removal of the air bubbles may be completed when a certain time elapses, or an image of the sample may be captured to measure whether the removal of the air bubbles is completed.

After the above, a fluorescence image is measured using a fluorescently labeled probe while the temperature of the sample is lowered. Specifically, for example, a fluorescence image is captured once in about 0.2° C. while the temperature of the sample is lowered from 85° C. to 50° C. This temperature range may be determined by a melting temperature of DNA as a target and the fluorescently labeled probe. That is, the temperature of the sample is once increased to a temperature higher than a melting temperature to be measured with a margin, and the measurement is performed to a temperature lower than the melting temperature to be measured.

Figure 5:
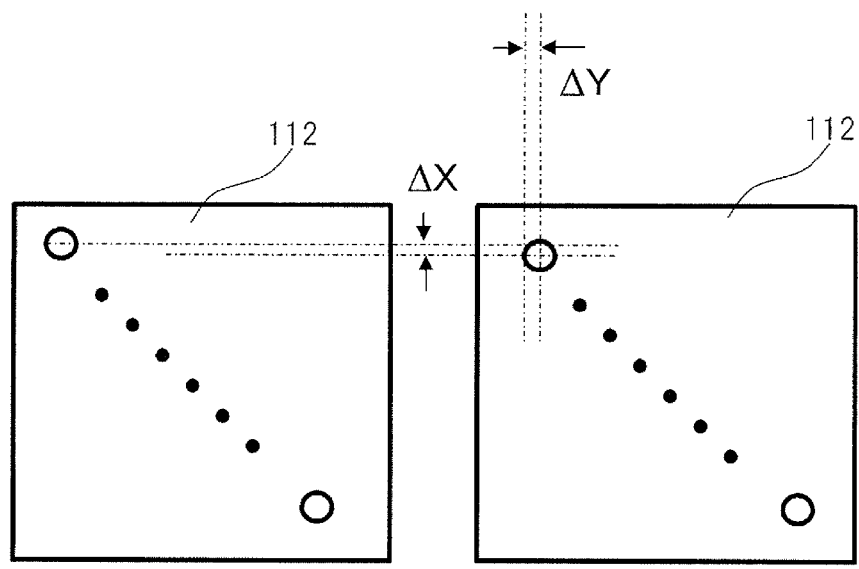
FIG. 5 is a conceptual diagram explaining a method of correcting positional deviation of a fluorescence measurement image.

Note that, due to the influence of thermal expansion and the like of the sample container 112 and the temperature adjuster 109 caused by a temperature change, a positional deviation occurs in images captured at each temperature. As illustrated in FIG. 5, the controller 111 of the present embodiment recognizes the position of each minute region from a plurality of acquired images, and detects positional deviation ($\Delta X$, $\Delta Y$) between corresponding minute regions. The controller 111 may have a function to correct this positional deviation, track a position of each minute region between a plurality of images, and calculate a melting curve. Since a melting curve obtained from a fluorescence image includes measurement noise, positional deviation noise, and the like, it is also possible to remove noise using a digital filter and calculate a melting temperature.

Note that the fluorescently labeled probe is not limited to a molecular beacon, and may be a DNA intercalator. The light source may include a halogen lamp, an LED light source, a laser light source, and the like, but is not limited to a specific light source. The imaging element is not limited to the CMOS sensor 108, and may be a camera using a CCD. The imaging element is not limited to a two-dimensional imaging element, and may be a one-dimensional line sensor or a photomultiplier. Note that the configuration of the optical system illustrated in FIG. 1 is an example, and the present invention is not limited to this. The lens and the filter in the optical system are not limited to those having a specific structure as long as a sample is irradiated with excitation light and fluorescence can be measured. The short-pass filter and the long-pass filter may be a band-pass filter that passes light of a specific wavelength. The dichroic filter may be a half mirror.

As described above, according to the digital PCR measuring apparatus of the first embodiment, fluorescence intensity and a melting curve can be measured with high accuracy by removing the influence of air bubbles, and a type of a gene can be determined with high accuracy.

Second Embodiment

Figure 6:
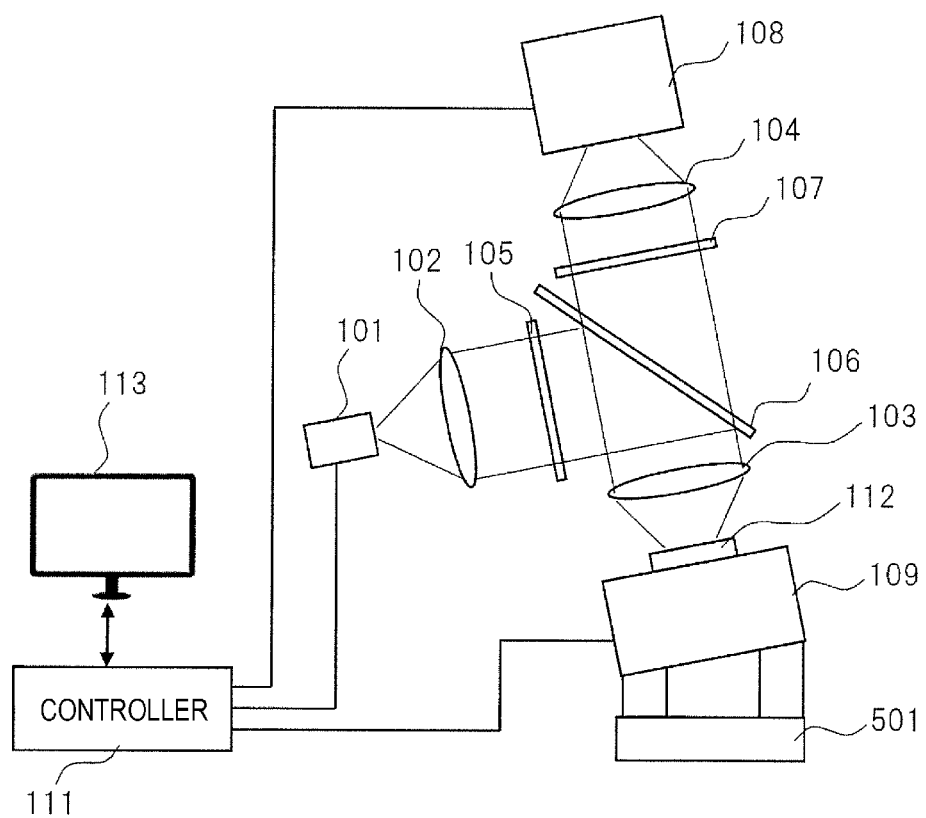
FIG. 6 is a configuration diagram of the digital PCR measuring apparatus according to a second embodiment.

A digital PCR measuring apparatus according to a second embodiment of the present invention will be described with reference to FIG. 6. In FIG. 6, the same components as those of the first embodiment (FIG. 1) are denoted by the same reference numerals, and redundant description will be omitted. In the second embodiment, an inclination table 501 configured to be able to hold the sample container 112 in an inclined manner with respect to a horizontal plane is provided as the air bubble removing part. In other words, the inclination table 501 is configured to constantly hold the sample container 112 in a state of being inclined with respect to the horizontal plane. In this regard, the above configuration is different from the configuration in which the inclination adjuster 110 of the first embodiment changes the inclination angle of the sample container 112 during the measurement operation. Also in the air bubble removing part of the second embodiment, by making it possible to arrange the sample container 112 in an inclined manner with respect to the horizontal plane, when air bubbles are generated in the sample container 112, the air bubbles move upward in the direction of gravity, and the air bubbles can be excluded from the range of fluorescence imaging. Needless to say, the inclination angle of the inclination table 501 may be further adjustable by an inclination adjustment mechanism (not illustrated). Note that, the example of FIG. 6 illustrates a case where the temperature adjuster 109 itself is held by the inclination table 501 in an inclined state, and the sample container 112 is held on the upper surface of the temperature adjuster 109.

In the digital PCR measuring apparatus of the second embodiment, the fluorescence imaging system including the lens 103, the dichroic mirror 106, the long-pass filter 107, and the lens 104 is arranged such that an optical axis of the system is perpendicular to the inclined sample container 112. That is, the fluorescence imaging system has an optical axis inclined with respect to the horizontal plane in accordance with the inclination with respect to the horizontal plane of the sample container 112. Then, an imaging surface of the CMOS sensor 108 is also arranged to be inclined in accordance with the inclination direction of the fluorescence imaging system. Further, a projection optical system (the lens 102 and the short-pass filter 105) that projects the light from the light source 101 is also inclined in accordance with the inclination direction of the fluorescence imaging system.

Also with the configuration of the second embodiment, when air bubbles are generated in the sample container 112 in a case where the temperature of a sample is increased, the air bubbles can be moved upward (with respect to the direction of gravity) in the sample container 112 so that the air bubbles can be excluded from the fluorescence imaging range, and highly accurate imaging and melting curve measurement can be performed. The angle at which the inclination table 501 inclines the sample container 112 is desirably an angle at which air bubbles can move in the sample container 112 and a minute region of the sample can be kept filled with oil. Specifically, the sample container 112 can be inclined within a range of about 10° to 20° with respect to the horizontal plane.

Third Embodiment

Figure 7:
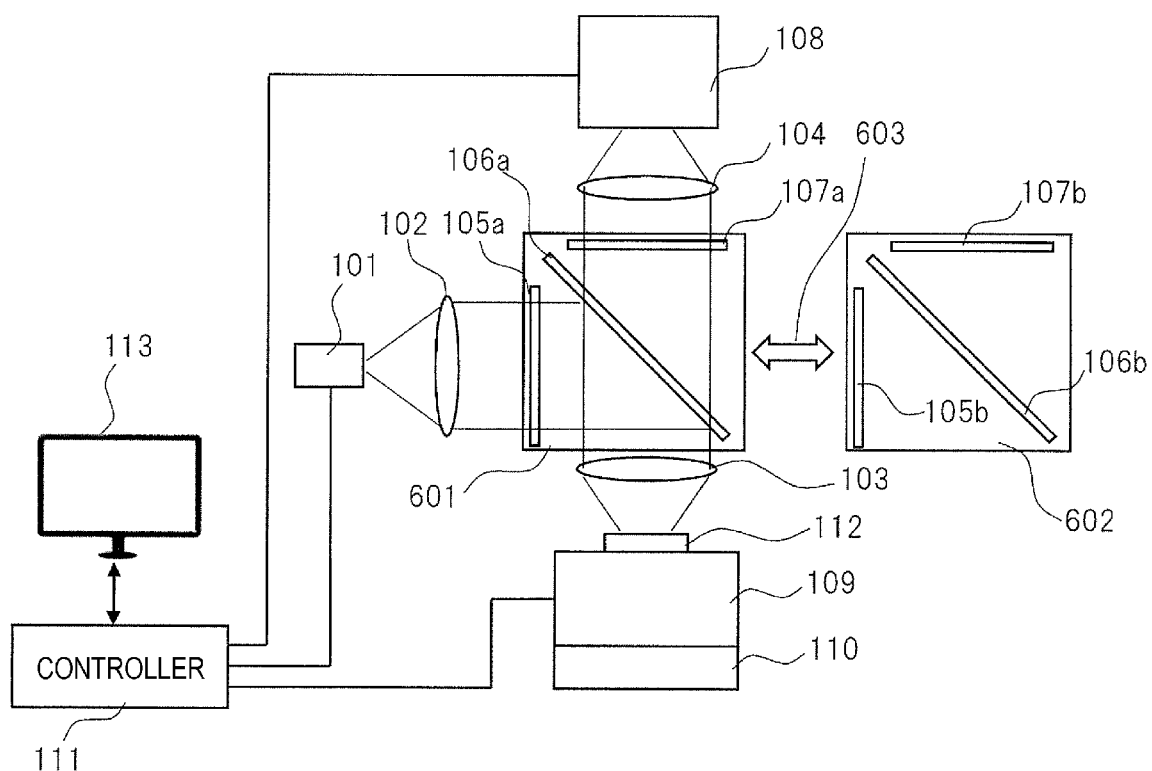
FIG. 7 is a configuration diagram of the digital PCR measuring apparatus according to a third embodiment.

A digital PCR measuring apparatus according to a third embodiment of the present invention will be described with reference to FIGS. 7 to 12C. FIG. 7 is a configuration diagram of the digital PCR measuring apparatus according to the third embodiment. In FIG. 7, the same components as those of the first embodiment (FIG. 1) are denoted by the same reference numerals, and redundant description will be omitted. The digital PCR measuring apparatus of the third embodiment includes a plurality of filter sets (601 and 602) including the short-pass filter 105, the dichroic mirror 106, and the long-pass filter 107, and is configured to be able to selectively insert these filter sets into a fluorescence imaging system, perform fluorescence measurement using a plurality of filters, and acquire a plurality of types of melting curves. In FIG. 7, as an example, two types of the filter sets 601 and 602 are provided. However, it goes without saying that the number of filter sets is not limited to two, and the number of filter sets may be three or more. The filter set 601 integrally holds a short-pass filter 105a, a dichroic mirror 106a, and a long-pass filter 107a in one housing. The filter set 602 integrally holds a short-pass filter 105b, a dichroic mirror 106b, and a long-pass filter 107b in one housing.

The filter sets 601 and 602 are inserted into or separated from an optical path as indicated by an arrow 603 by a moving mechanism (not illustrated). The filter sets 601 and 602 correspond to fluorescence measurement of different fluorescent dyes, and the short-pass filters 105a and 105b have different transmission wavelengths. Specifically, a filter set for excitation light and fluorescence corresponding to FAM, VIC, ROX, Cy3, Cy5, or the like as the fluorescent dye can be used. Note that, in FIG. 7, the inclination adjuster 110 is provided as the air bubble removing part. However, it goes without saying that the inclination table 501 or another bubble removing part may be provided instead of the inclination adjuster.

Figure 8:
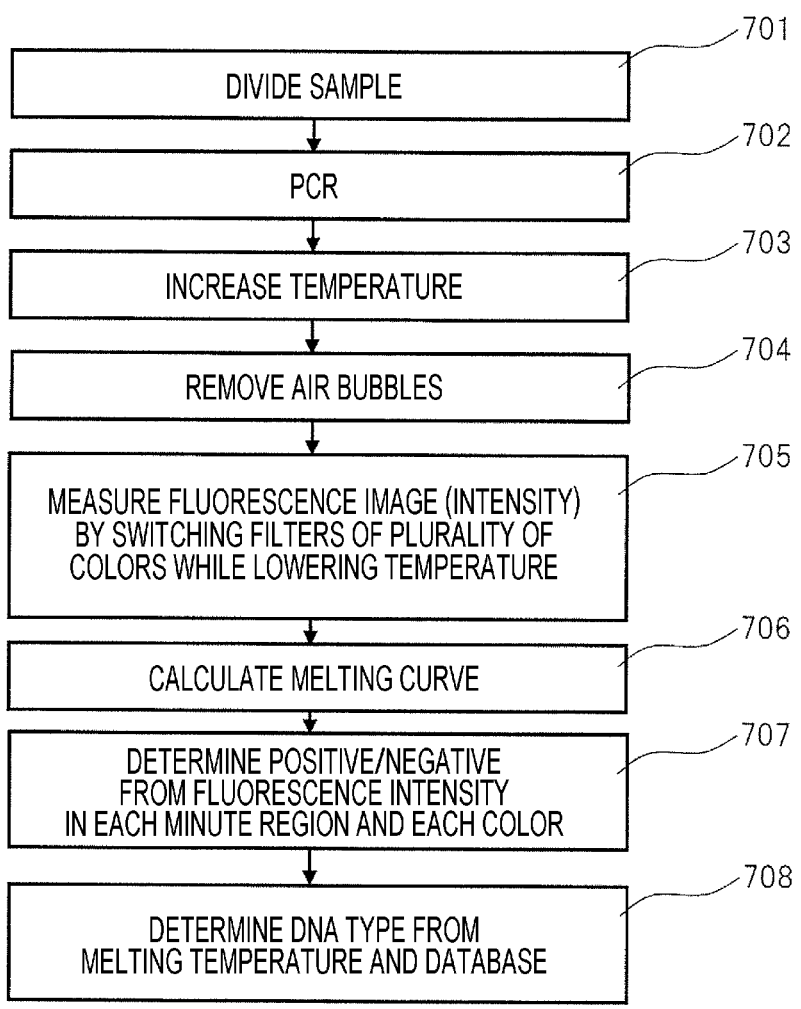
FIG. 8 is a flowchart explaining a measurement procedure when a type of DNA is determined using the digital PCR measuring apparatus according to the third embodiment.

With reference to the flowchart of FIG. 8, a measurement procedure in the digital PCR measuring apparatus of the third embodiment will be described. Here, an example in which two types of the filter sets 601 and 602 are alternately switched and used and 12 types of fluorescence measurement (fluorescence measurement A and fluorescence measurement B) are performed will be described. First, a sample is divided into a plurality of minute regions and put into the sample container 112 (Step 701), and DNA is amplified by PCR in each of a plurality of the regions (Step 702). After DNA is amplified, the sample container 112 is set in the digital PCR measuring apparatus, the temperature is raised by the temperature adjuster 109 (Step 703), and air bubbles generated in the sample container 112 are removed by the inclination adjuster 110 (Step 704). After that, while the temperature of the sample is lowered by the temperature adjuster 109, and while a plurality of filter sets (601 and 602) are switched, the fluorescence image is measured (Step 705). A melting curve is calculated from the captured fluorescence image, and a melting temperature is calculated (Step 706). In each minute region, whether DNA is contained (positive) or not contained (negative) in each minute region is determined using information of fluorescence intensity in each fluorescence color (Step 707). A type of a gene is determined based on the calculated melting temperature and a database of melting temperatures prepared in advance (Step 708).

In the determination of whether DNA in each region is positive or negative, information on fluorescence intensity is used. At this time, the influence of irradiation light intensity can be removed by using a ratio between fluorescence intensity at a temperature lower than a melting temperature and fluorescence intensity at a temperature higher than a melting temperature. Alternatively, it is also possible to use a difference between fluorescence intensity at a temperature lower than a melting temperature and fluorescence intensity at a temperature higher than a melting temperature. Specifically, for example, by subtracting fluorescence intensity at 85° C. from fluorescence intensity at 50° C., the influence of fluorescence of a fluorescently labeled probe itself, that is, the influence of the background can be removed.

Figure 9A:
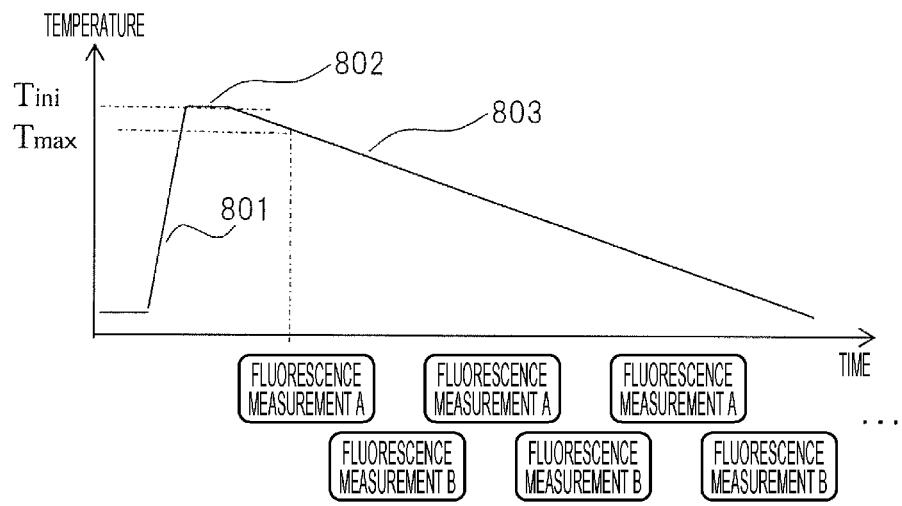
FIG. 9A is a graph illustrating a temperature change and a procedure of fluorescence measurement when measurement is performed by the digital PCR measuring apparatus according to the third embodiment.

The operation of Step 705 of FIG. 8 will be described in more detail with reference to FIGS. 9A and 9B. FIG. 9A is a graph for explaining a curve illustrating a temporal change in a temperature of a sample and a timing of performing the fluorescence measurement (A or B). Further, FIG. 9B is a flowchart illustrating a procedure of the operation.

First, a temperature of a sample is raised by the temperature adjuster 109 (curve 801 in FIG. 9A). When the temperature of the sample rises to an initial temperature $t_{ini}$, air bubbles are generated in the sample container 112. The initial temperature $t_{ini}$ is set to a temperature higher than an upper limit temperature $t_{max}$ at which melting curve measurement is performed. The air bubbles are removed using the inclination adjuster 110. After that, after waiting for a certain time until air bubbles are removed (reference numeral 802 in FIG. 9A), fluorescence measurement is performed while the temperature of the sample is lowered (curve 803 in FIG. 9A). At this time, in the fluorescence measurement, the fluorescence measurement A corresponding to the filter set 601 and the fluorescence measurement B corresponding to the filter set 602 are alternately and repeatedly performed. The timing and the number of times of performing the measurements are not limited to those illustrated in FIG. 9A.

Figure 9B:
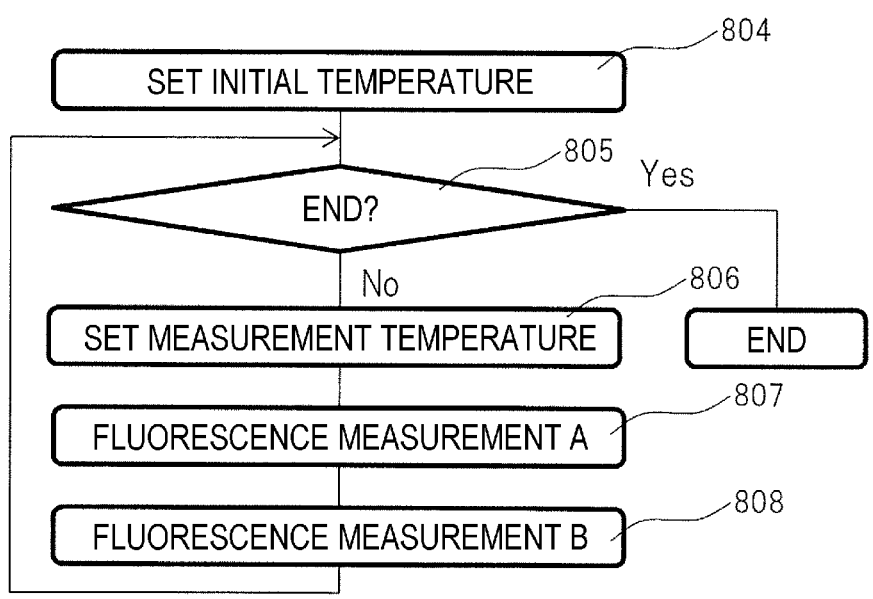
FIG. 9B is a flowchart explaining an operation procedure when measurement is performed by the digital PCR measuring apparatus according to the third embodiment.

FIG. 9B is a flowchart illustrating a procedure related to temperature setting. When an initial temperature is set (Step 804) and a measurement temperature is further set (Step 806), the fluorescence measurement A and the fluorescence measurement B are repeated until a final temperature is reached (Steps 807 and 808). When the final temperature is reached, the measurement ends (Step 805).

The filter sets are switched in the above embodiment. Alternatively, the light sources may be switched instead of or in addition to switching of the filter sets. Further, the configuration may be such that, instead of switching all the filter sets, only some of the filters in the filter sets are switched. Specifically, for example, it is also possible to employ a configuration in which light of the same wavelength is emitted as the excitation light and only the long-pass filter 107 is switched at the time of fluorescence imaging.

FIGS. 10A to 10E illustrate examples of two melting curves obtained for each minute region and differential curves of the melting curves. All the examples illustrate a case where there may exist DNA A hybridized to a fluorescently labeled probe modified with a fluorescent dye A and DNA B hybridized to a fluorescently labeled probe modified with a fluorescent dye B.

Figure 10A:
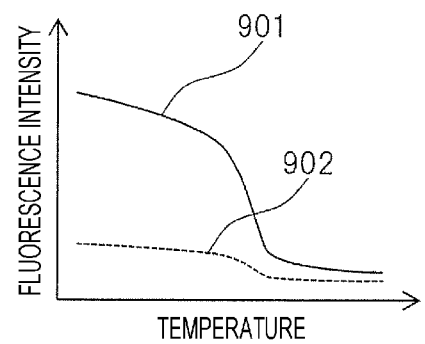
FIG. 10A is an example of a melting curve and its differential curve measured by the digital PCR measuring apparatus according to the third embodiment.
Figure 10A:
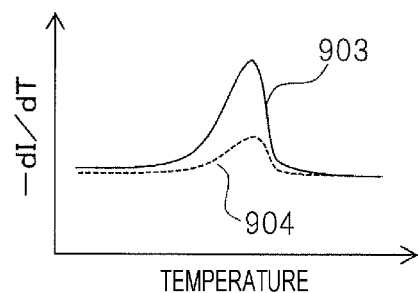

FIG. 10A is an example of melting curves 901 and 902 and differential curves 903 and 904 of the melting curves 901 and 902 of a minute region in which DNA A is positive. Such the melting curves and the differential curves can be displayed on a display screen of the display 113, or can be output by a printer (not illustrated) or the like.

The controller 111 controls the temperature adjuster 109 to once raise a temperature of a sample and then uses the fluorescence measurement part to perform measurement while lowering the temperature, so as to acquire the melting curves 901 and 902. Further, the controller 111 obtains the differential curves 903 and 904 of the melting curves 901 and 902 to calculate a melting temperature from a peak position of the curves.

A melting temperature can be calculated from a melting curve in a case where DNA A is positive, and a type of DNA can be calculated. In contrast, since a fluorescence spectrum has spread and there is leakage between the fluorescence measurement A and the fluorescence measurement B, it seems that a melting curve has been able to be measured even though DNA B is negative. In such a case, from the comparison of a plurality of melting curves and the property (intensity, peak position, shape, and the like) of a differential curve, it can be determined that a certain curve is caused by leakage light and the DNA is negative. In the case of FIG. 10A, as far as only the curves 901 and 902 are considered, both DNA A and DNA B look positive. However, when at the differential curves 903 and 904 are observed, both the differential curves 903 and 904 reach peaks at substantially the same temperature. For this reason, it can be determined that only DNA A is positive, while DNA B according to differential curve 904 is negative.

Figure 10B:
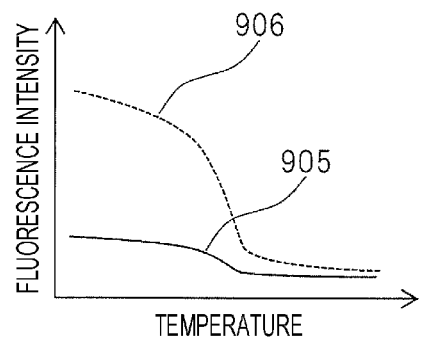
FIG. 10B is an example of a melting curve and its differential curve measured by the digital PCR measuring apparatus according to the third embodiment.
Figure 10B:
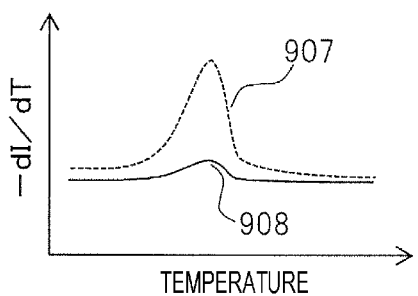

FIG. 10B is an example of melting curves in a case where DNA B is positive. Since light leaking from a melting curve 906 is observed on the melting curve 905, DNA A can be determined to be negative.

Figure 10C:
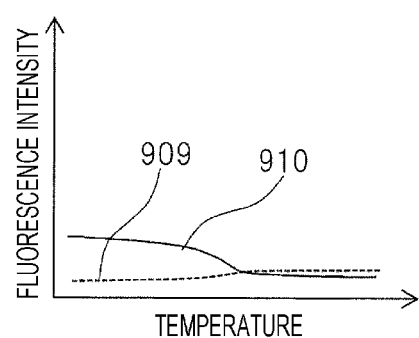
FIG. 10C is an example of a melting curve and its differential curve measured by the digital PCR measuring apparatus according to the third embodiment.
Figure 10C:
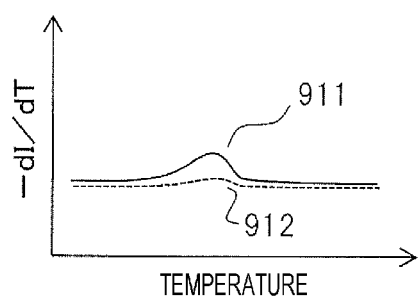

FIG. 10C is another example of melting curves in a case where DNA A is positive and DNA B is negative. In digital PCR, variations occur between a plurality of minute regions in connection with PCR amplification efficiency, and a minute region with low fluorescence intensity may occur. For example, the fluorescence intensity of a melting curve 910 in FIG. 10C is a curve of fluorescence intensity similar to that of the melting curve 905 due to leakage of another minute region. However, it can be determined that DNA A is positive from comparison of the relative intensity with a melting curve 909 and commonality of melting temperatures.

Figure 10D:
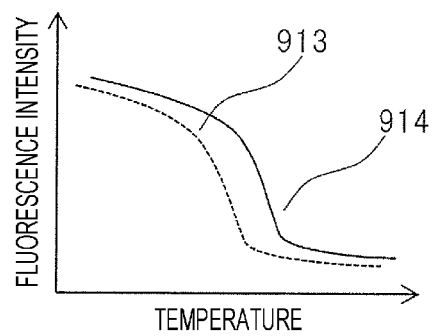
FIG. 10D is an example of a melting curve and its differential curve measured by the digital PCR measuring apparatus according to the third embodiment.
Figure 10D:
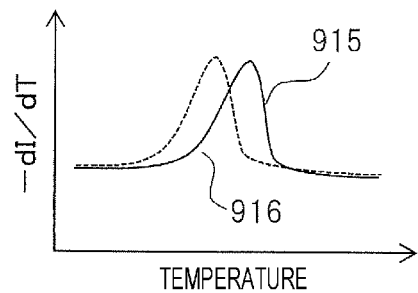
Figure 10E:
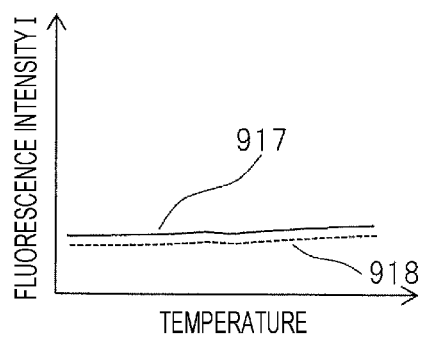
FIG. 10E is an example of a melting curve and its differential curve measured by the digital PCR measuring apparatus according to the third embodiment.
Figure 10E:
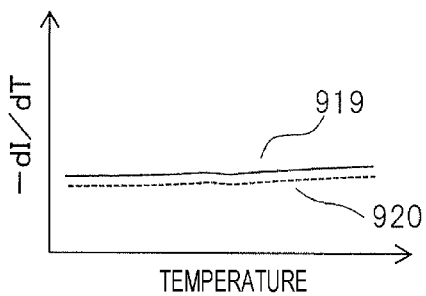

FIG. 10D is an example of melting curves where both DNA A and DNA B are positive. By the fluorescence measurements A and B, two different melting curves 913 and 914 and their differential curves 915 and 916 are obtained. Melting temperatures of DNA A and DNA B are obtained from peak positions of the differential curves 915 and 916. Since the peak positions of the differential curves 915 and 916 are different, it can be determined that two types of DNA (DNA A and DNA B) are contained in one minute region to be measured. In contrast, FIG. 10E is an example of melting curves in which both DNA A and DNA B are negative.

Figure 11A:
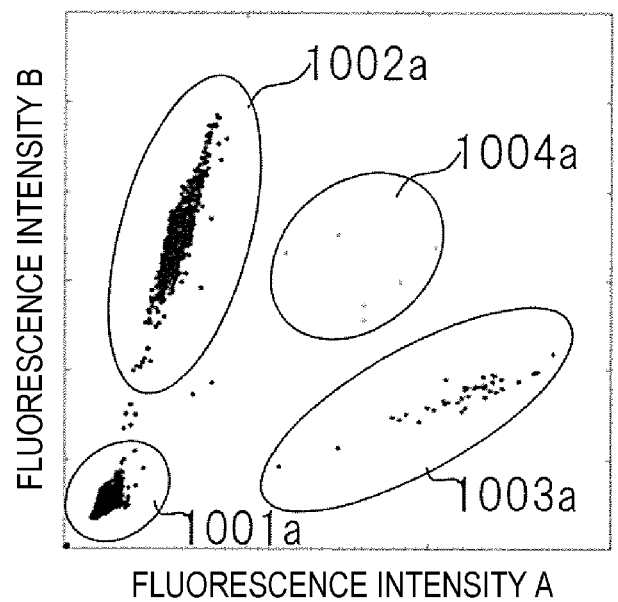
FIG. 11A is an example of a result of measurement by the digital PCR measuring apparatus according to the third embodiment.
Figure 11B:
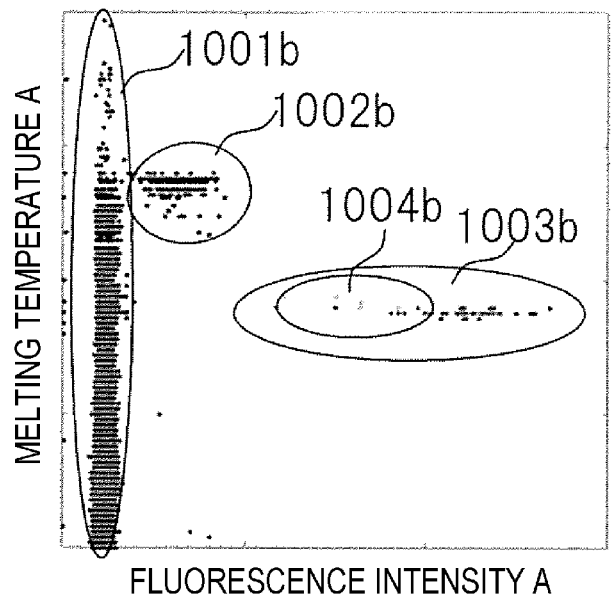
FIG. 11B is an example of a result of measurement by the digital PCR measuring apparatus according to the third embodiment.
Figure 11C:
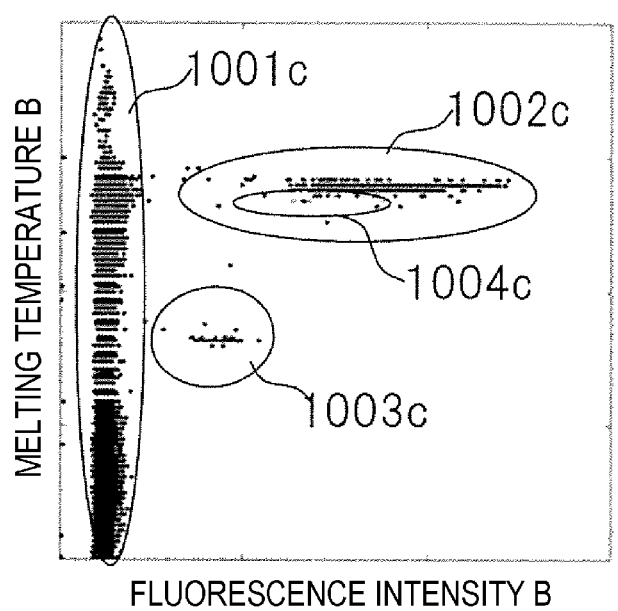
FIG. 11C is an example of a result of measurement by the digital PCR measuring apparatus according to the third embodiment.

FIGS. 11A to 11C are examples of graphs of results of measuring and classifying two types of genes (wild type and its mutant type) using the digital PCR measuring apparatus of the third embodiment. Such a graph can be displayed on a display screen of the display 113, or can be output by a printer (not illustrated) or the like.

FIGS. 11A to 11C illustrate a case where a mutant-type gene is hybridized to a fluorescently labeled probe modified with the fluorescent dye A, and a wild-type gene is hybridized to a fluorescently labeled probe modified with the fluorescent dye B. Melting temperatures are different between the wild-type gene and the mutant gene.

When fluorescence intensity A and fluorescence intensity B are measured for a plurality of minute regions by switching two types of filter sets, each minute region is plotted as illustrated in FIG. 11A. Plots may be divided into the following four plot groups (1) to (4):

(1) Plot group 1001a of a minute region in which DNA is determined to be negative;
(2) Plot group 1002a of a minute region determined to contain a wild-type gene;
(3) Plot group 1003a of a minute region determined to contain a mutant gene; and
(4) Plot group 1004a of a minute region determined to contain both wild-type and mutant-type genes.

Further, two melting temperatures (the melting temperature A and the melting temperature B) can be calculated from two-color melting curves based on the fluorescent dye A and the fluorescent dye B. FIG. 11B is a graph illustrating a relationship between the fluorescence intensity A and the melting temperature A measured in each minute region. FIG. 11C is a graph illustrating a relationship between the fluorescence intensity B and the melting temperature B measured in each minute region.

As illustrated in FIGS. 11B and 11C, a minute region in which DNA is determined to be negative is plotted near plot groups 1001*b* and 1001*c*. In a minute region in which DNA is determined to be negative, fluorescence intensity obtained as a result of measurement is low, and a melting curve has almost no temperature dependency. Accordingly, a melting temperature is unstable. For this reason, the plot groups 1001*b* and 1001*c* are plots that vary in a wide range in the vertical axis direction.

In contrast, in a minute region containing a mutant-type gene, a high value is detected for the fluorescence intensity A (1003*b*), and a large number of plots are obtained near a specific melting temperature A. In a minute region containing a wild-type gene, a high value is detected for the fluorescence intensity B (1002*c*), and a large number of plots are obtained near a specific melting temperature B.

Note that, since a minute region containing a wild-type gene is modified with the fluorescent dye B, a low value should be detected for the fluorescence intensity A. However, a plot group 1002*b* in which a value of the fluorescence intensity A is large as compared with that in the plot group 1001*b* is observed due to leakage light based on the fluorescent dye A from an adjacent region. However, the fluorescence intensity A of the plot group 1002*b* is relatively small as compared with the fluorescence intensity B of the plot group 1002*c* described above. For this reason, the plot group 1002*b* can be determined to be a plot group due to the influence of leakage light.

Furthermore, a minute region including both a mutant-type gene and a wild-type gene is plotted in a location 1004*b* similar to the plot group 1003*b* for a minute region including a mutant-type gene in a graph of the fluorescence temperature A and the melting temperature A. In a graph of a fluorescence temperature B and a melting temperature B, the minute region is plotted in a location 1004*c* similar to the plot group 1002*c* for a minute region containing a wild-type gene. As described above, according to the third embodiment, types of genes can be determined with high accuracy by combining a plurality of fluorescence intensities and a plurality of melting temperatures.

Figure 12A:
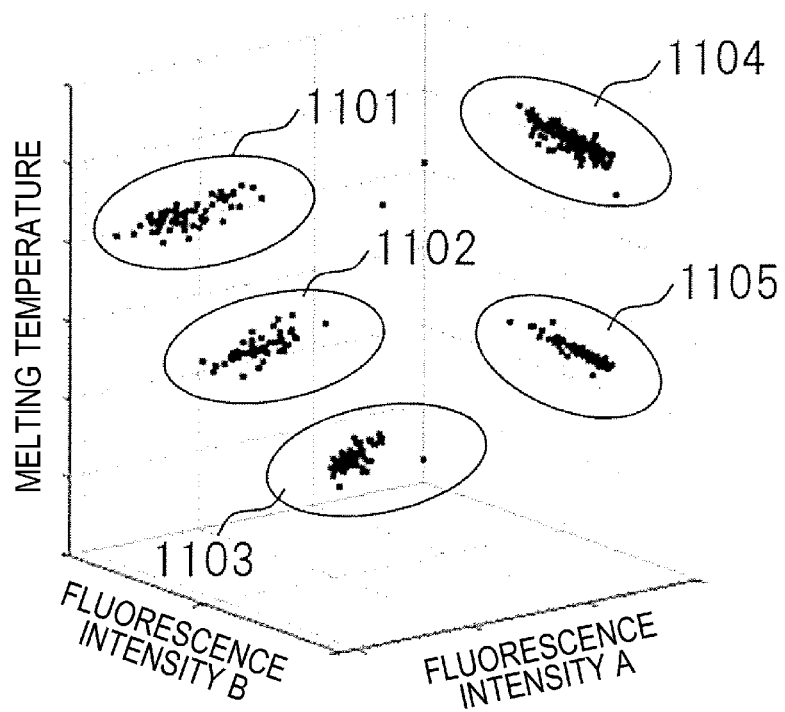
FIG. 12A is an example of a graph as a result of determining a detection target gene by the digital PCR measuring apparatus according to the third embodiment.

Further, a large number of types of genes can be simultaneously determined by a combination of a fluorescent color and a melting temperature. FIG. 12A illustrates an example of a graph of a result of determining types of genes by the digital PCR measuring apparatus according to the present embodiment, targeting a plurality of types of genes. Such a graph can be displayed on a display screen of the display 113, or can be output by a printer (not illustrated) or the like.

Figure 12B:
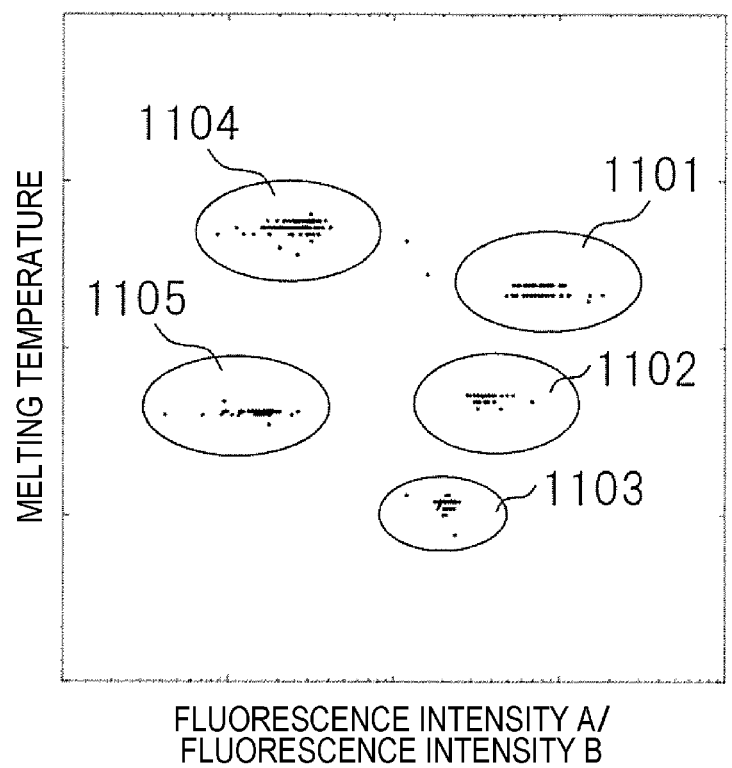
FIG. 12B is an example of a graph as a result of determining a detection target gene by the digital PCR measuring apparatus according to the third embodiment.

In the graph of FIG. 12A, the fluorescence intensity A, the fluorescence intensity B, and a melting temperature are taken as axes of three-dimensional coordinates. It is found that three types of genes (1101, 1102, and 1103) that are hybridized to a probe modified with the fluorescent dye A and have different melting temperatures and two types of genes (1101 and 1105) that are hybridized to a probe modified with the fluorescent dye B can be classified. Further, as illustrated in FIG. 12B, even in a case where a ratio of the fluorescence intensity A to the fluorescence intensity B and a melting temperature are respectively given on the horizontal axis and the vertical axis in two-dimensional coordinates, it is possible to simultaneously determine a large number of genes in the same manner as described above.

Figure 12C:
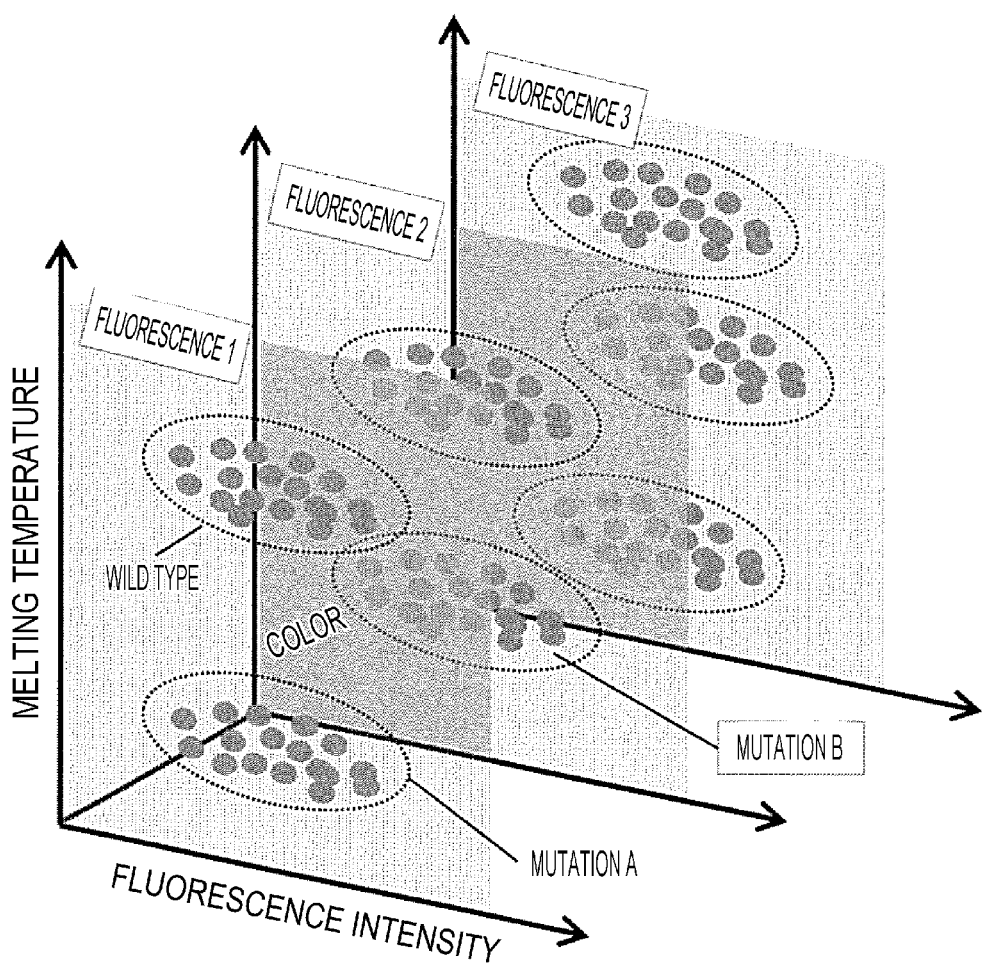
FIG. 12C is an example of a graph as a result of determining a detection target gene by the digital PCR measuring apparatus according to the third embodiment.

Note that, in the present embodiment, an example in which two types of filter sets are switched and measurement is performed in two colors is described. However, the present invention is not limited to this. The measurement may be performed by switching three types, four types, or more of filter sets. FIG. 12C illustrates a case where three kinds of fluorescent dyes are used. As illustrated in FIG. 12C, by giving fluorescence intensity, a fluorescence color, and a melting temperature to axes of three-dimensional coordinates, it is possible to determine a plurality of types of genes including mutant-type and wild-type genes.

Others

Note that the present invention is not limited to the above embodiment and includes a variety of variations. For example, the above embodiments are described in detail for easier understanding of the present invention, and the present invention is not necessarily limited to the embodiments that include the entirety of the described configurations. Further, a part of a configuration of a certain embodiment can be replaced with a configuration of another embodiment, and a configuration of a certain embodiment can also be added to a configuration of another embodiment. Further, for a part of a configuration of each embodiment, other configurations can be added, removed, or replaced.

REFERENCE SIGNS LIST

101 light source
102,103,104 lens
105 short-pass filter
106 dichroic mirror
107 long-pass filter
108 CMOS sensor
109 temperature adjuster
110 inclination adjuster
501 inclination table
111 controller
112 sample container
113 display
202,203 droplet
204 oil
206,207 well
403 air bubbles
601,602 filter set
901,902,905,906,909,910,913,914,917,918 melting curve
903,904,907,908,911,912,915,916,919,920 differential curve
1001*a-c*,1002*b-c*,1003*a-c*,1004*a-c*,1101-1105 plot group

The invention claimed is:

1. A digital PCR measuring apparatus that detects DNA contained in a sample, comprising:
   a temperature adjuster that controls a temperature of a sample container including a plurality of minute regions to which a fluorescently labeled probe and a sample containing DNA to be detected are supplied, the plurality of minute regions are a plurality of wells arranged in a planar array, and each of the plurality of wells having a diameter of 10 μm to 100 μm;
   a fluorescence measurement part that measures fluorescence intensity of the plurality of minute regions; and
   a controller that controls the temperature adjuster and the fluorescence measurement part, wherein
   the controller controls the temperature adjuster to increase a temperature of the sample container, and, after removing an air bubble generated in the sample container, measures fluorescence intensity of the plurality of minute regions while controlling the temperature adjuster to lower a temperature of the sample container, and measures a melting curve of the plurality of minute regions.

2. The digital PCR measuring apparatus according to claim 1, further comprising an air bubble removing part that removes an air bubble by adjusting an inclination angle of the sample container with respect to a horizontal plane.

3. The digital PCR measuring apparatus according to claim 1, further comprising an inclination table configured to be able to hold the sample container in a manner inclined with respect to a horizontal plane.

4. The digital PCR measuring apparatus according to claim 3, wherein
the fluorescence measurement part has a fluorescence imaging system that guides fluorescence emitted from the sample container to an imaging element, and
the fluorescence imaging system has an optical axis inclined with respect to the horizontal plane in accordance with an inclination of the sample container with respect to the horizontal plane.

5. The digital PCR measuring apparatus according to claim 3, wherein the inclination table is configured to be able to incline the sample container at an angle in a range of 10° to 20° with respect to the horizontal plane.

6. The digital PCR measuring apparatus according to claim 1, wherein the temperature adjuster increases a temperature of the sample container to a temperature higher by 5° C. or more than a melting temperature of the DNA to be detected and the fluorescently labeled probe in a case of increasing the temperature.

7. The digital PCR measuring apparatus according to claim 1, wherein the temperature adjuster makes a temperature change when increasing a temperature of the sample container faster than a temperature change when lowering a temperature of the sample container.

8. The digital PCR measuring apparatus according to claim 1, wherein the controller is configured to correct positional deviation between a plurality of images captured by the fluorescence measurement part while lowering a temperature of the sample container.

9. The digital PCR measuring apparatus according to claim 1, wherein
the fluorescence measurement part includes a plurality of filters, the plurality of filters having different transmission wavelengths, and
the controller is configured to capture a fluorescence image by the fluorescence measurement part while switching the plurality of filters when measuring fluorescence intensity of the plurality of minute regions while lowering a temperature of the sample container.

10. The digital PCR measuring apparatus according to claim 9, wherein the controller performs fluorescence measurement on each of the plurality of filters to acquire a plurality of melting curves, acquires differential curves of the plurality of melting curves, and determines whether or not DNA to be analyzed is contained in the minute region according to a property of the melting curves or the differential curves.

11. The digital PCR measuring apparatus according to claim 10, wherein the controller determines an influence of leakage light by comparing a plurality of the melting curves and the differential curves.

12. The digital PCR measuring apparatus according to claim 10, wherein the controller determines whether or not DNA to be analyzed is contained in a minute region based on a ratio or a difference between fluorescence intensity at a first temperature lower than a melting temperature and fluorescence intensity at a second temperature higher than the melting temperature.

\* \* \* \* \*